J. Green,

Glass Furnace.

N° 63,241.  Patented Mar. 26, 1867.

Witnesses:

Inventor.
Jacob Green
By his Atty.

United States Patent Office.

JACOB GREEN, OF NORRISTOWN, PENNSYLVANIA.

Letters Patent No. 63,241, dated March 26, 1867.

---

IMPROVED GLASS FURNACE.

---

The Schedule referred to in these Letters Patent and making part of the same.

---

TO ALL WHOM IT MAY CONCERN:

Be it known that I, JACOB GREEN, of Norristown, Montgomery county, Pennsylvania, have invented an Improved Glass Furnace; and I do hereby declare the following to be a full, clear, and exact description of the same, reference being had to the accompanying drawing, and to the letters of reference marked thereon.

My invention consists of a glass furnace constructed and combined with certain blast and steam pipes, in the peculiar manner fully described hereafter, with the view of economizing fuel, and so thoroughly heating the pots or crucibles that the cheap sulphate of soda may be used instead of carbonate of soda, and the combination of deleterious products of combustion with the glass prevented.

In order to enable others skilled in the art to make and use my invention, I will now proceed to describe its construction and operation, reference being had to the accompanying drawing which forms a part of this specification, and in which—

Figure 1:
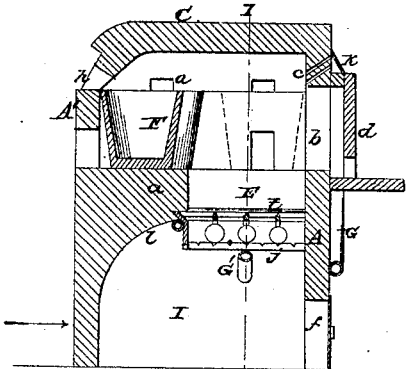

Figure 1 is a sectional elevation of my improved glass furnace.

Figure 2:
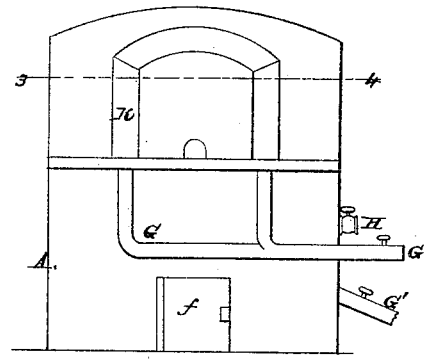

Figure 2, a front elevation.

Figure 3:
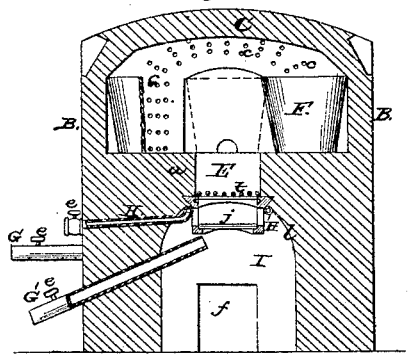

Figure 3, a sectional elevation on the line 1–2, fig. 1.

Figure 4:
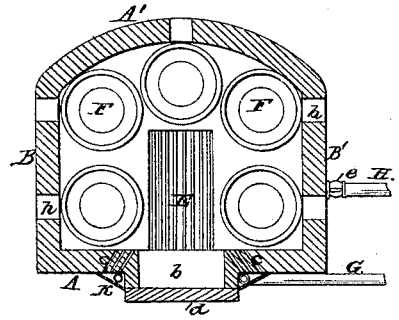

Figure 4, a sectional plan on the line 3–4, fig. 2.

A is the front, A' the back and B and B' the two side walls of the furnace, and C (fig. 3) is the arched top. At the lower portion of the furnace is formed an ash-pit or "cave," I, and above the latter is a "siege" or floor, $a$, in which, adjacent to the front wall A, is sunk a fire-place, E. In the front wall, directly opposite the fire-place, is an opening, $b$, of such a size as to admit the pots F, the latter standing on the siege, near the walls of the furnace, as shown in fig. 1. An air pipe, G, communicates with a chamber formed in front of the furnace, at the edges of the opening $b$, and in the front wall A are openings $c$, through which the air can pass from the said chamber into the furnace, the openings being so inclined as to direct the streams of air towards the fire-place E. Into the ash-pit projects an air pipe, G', and a steam pipe, H, each of which, as well as the air pipe G, is provided with a suitable stop-valve, $e$. The steam pipe H may extend round the ash-pit near its roof, and may be perforated so as to insure a thorough dissemination of the steam. To the opening $b$ is fitted a slab, $d$, and in the wall A, beneath the fire-place, is the ash-pit opening, $f$, which is closed by a suitable door. To the working holes $h$ in the sides of the furnace are fitted stoppers, in such a manner as not to entirely close the holes. When the fire has been kindled and the materials for making the glass have been introduced into the pots, the openings $h$ and $f$ are nearly closed, and steam is permitted to pass through the pipe H and air through the pipes G and G'. The air which passes through the openings $c$ is so directed towards the fire-place that the heated products of combustion are caused first to circulate round the pots F and then to pass over the pots towards the exit openings $h$. The heat which in ordinary furnaces is wasted by being directed mainly to the top of the same, is thus employed in melting the glass, while the formation of "tears" (which are occasioned by the melting of portions of the top of the furnace, and which drop into and injure the glass) is prevented. By the introduction of air and steam below the fire-place, and by directing the blasts of air among the products of combustion before the latter pass over the pots, the carbon or any gaseous products of combustion are consumed before they can be brought in contact and combine with the materials in the pots. The combination of injurious matter with the glass is thus prevented. As the exit openings are of limited dimensions, a constant pressure is maintained within the furnace, and any strong outward draught is avoided, the gases being thus retained within the furnace until thoroughly consumed, instead of being discharged with the heat to the stack, as in furnaces of the ordinary construction.

I have found that by the use of a furnace of the above description I am enabled, with about one-half the fuel required in ordinary furnaces, to obtain such a heat that the cheap sulphate of soda may be substituted for the more expensive carbonate of soda generally employed in the manufacture of glass on account of its fusibility.

I prefer the form of furnace described on account of its simplicity, but there may be two fire-places, one at each end of the furnace, and any desired number of pots may be used. It is important for many reasons that the ash-pit or cave I should be of large dimensions. In order to accomplish this end I form on the top the arched roof $i$, the key of which consists of a cast-iron frame, $j$, the latter serving to support the grate-bars $t$, which can be cleaned from below by an operator who has gained access to the enlarged ash-pit or cave for the purpose.

As this arrangement is applicable to other furnaces, and as it forms the subject for a separate application for a patent, further allusion to it here will be unnecessary.

I claim as my invention, and desire to secure by Letters Patent—

1. Subjecting the materials of which glass is to be formed to the action of the products of combustion under air pressure by blast within a furnace, as set forth.

2. The combination of a glass furnace with pipes so arranged that blasts of air and steam can be introduced among the products of combustion before the latter are brought into contact with the contents of the pots or crucibles for the purpose specified.

3. The combination with a glass furnace of a blast pipe and openings, so arranged as to direct the products of combustion around the pots, substantially as set forth.

4. The within-described furnace, consisting of the walls A A′ B B′, with their openings, the top C, siege $d_1$ and fire-place E, the whole being constructed and arranged as described.

In testimony whereof I have signed my name to this specification in the presence of two subscribing witnesses.

JACOB GREEN.

Witnesses:
 CHARLES E. FOSTER,
 W. J. R. DELANY.